United States Patent [19]

Ramaley

[11] Patent Number: 5,995,940
[45] Date of Patent: Nov. 30, 1999

[54] METHOD AND SYSTEM FOR EDITING MULTIVALUED PROPERTIES OF AN OBJECT

[75] Inventor: Alan Aitken Ramaley, Seattle, Wash.

[73] Assignee: Microsoft Corporation, Redmond, Wash.

[21] Appl. No.: 08/821,232

[22] Filed: Mar. 20, 1997

[51] Int. Cl.$^6$ ................................................. G04B 19/00
[52] U.S. Cl. ..................................... 705/9; 705/8; 707/10; 707/102; 707/103
[58] Field of Search .......................... 705/9, 8; 707/10, 707/102, 103; 395/200.32, 650

[56] References Cited

U.S. PATENT DOCUMENTS

| | | | |
|---|---|---|---|
| 5,301,320 | 4/1994 | McAtee et al. | 395/650 |
| 5,745,901 | 4/1998 | Entner et al. | 707/103 |
| 5,826,020 | 10/1998 | Randell | 395/200.32 |
| 5,826,239 | 10/1998 | Du et al. | 705/8 |

*Primary Examiner*—Thomas R. Peeso
*Attorney, Agent, or Firm*—Jones & Askew, LLP

[57] ABSTRACT

A method and system for editing the assignments for a task in a project management software environment. The editing can be preformed in a dropdown grid, which is a grid that includes a name column, including a checkbox, and a total hours column. The dropdown grid further includes cells in the name column and the total work column. The user can select a cell in the dropdown grid by using arrow keys on a keyboard or by clicking a mouse button. The user may assign an individual to an assignment or remove an individual from an assignment by checking or unchecking a checkbox in a name column cell. In addition, the user may edit the amount of total work for an assignment by selecting the total work cell corresponding to the assignment and entering a total work value.

27 Claims, 10 Drawing Sheets

| | Task Name | People Assigned | Total Work | Deadline | Priority | Project |
|---|---|---|---|---|---|---|
| 1 | ▽ November Newsletter | | 17.6 weeks | | Very high | |
| 2 | ▽ First Draft Articles | | 8.8 weeks | | | |
| 3 | ☐ Article 1 | Claudia | 11 days | | Medium | |
| 4 | ☐ Article 2 | Connie | 20 days | | Medium | |
| 5 | ☐ Article 3 | Rebecca, Connie | 10 days | | Medium | |
| 6 | ☐ Article 4 | Rebecca, Connie | 3 days | | | |
| 7 | ▽ Second Draft Articles | | 2.8 weeks | | | |
| 8 | ☐ Article 1 | Connie | 2 days | | Medium | |
| 9 | ☐ Article 2 | Monica | 8 days | | Medium | |
| 10 | ☐ Article 3 | Rebecca | 2 days | | Medium | |
| 11 | ☐ Article 4 | Claudia | 2 days | | | |
| 12 | ▽ Final Draft Articles | | 2.8 weeks | | | |
| 13 | ☐ Article 1 | Claudia | 8 days | | Medium | |
| 14 | ☐ Article 2 | Connie | 2 days | | Medium | |
| 15 | ☐ Article 3 | Monica | 2 days | | Medium | |
| 16 | ☐ Article 4 | Rebecca | 2 days | | | |
| 17 | ▽ Layout | | 2.2 weeks | | | |
| 18 | ☐ Diagrams/Illustrations | Connie | 4 days | | Medium | |
| 19 | ☐ Articles | Monica | 4 days | | Medium | |
| 20 | ☐ Headlines/Titles | Rebecca | 3 days | | Medium | |
| 21 | ▽ Delivery | | 1 week | | | |
| 22 | ☐ Artwork to printers | Claudia | 1 day | | Medium | |

METHOD AND SYSTEM FOR EDITING MULTIVALUED PROPERTIES OF AN OBJECT

TECHNICAL FIELD

This invention relates to a system and method for editing multi-valued properties of an object. More particularly, this invention relates to a method and system for editing the assignments for a task in a project management software environment.

BACKGROUND OF THE INVENTION

Typically, part of a project manager's job is to track and to report the progress made in completing specific tasks. Project management software has been developed to assist users in this tracking and reporting. Project management software generally allows a user to enter and manipulate tasks, resources, and assignments. A task is a project that needs to be completed. Resources are typically the individuals who complete the tasks. Assignments are the links between tasks and resources. In other words, an assignment is the allocation of a particular resource, or individual, to a particular task. Several resources, or individuals, may be assigned to complete a task. Thus, there may be several assignments for a single task.

Figure 1:
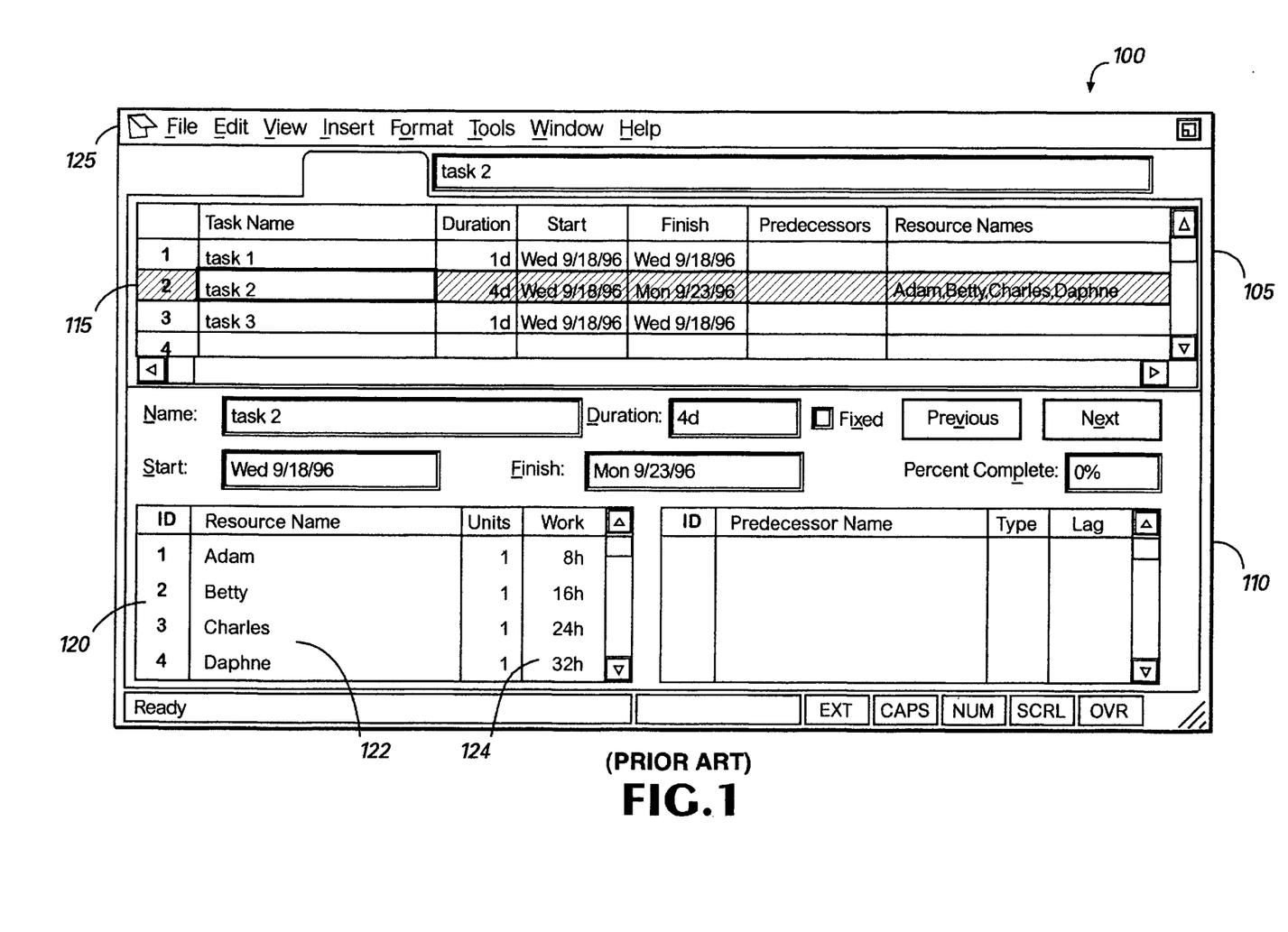
FIG. 1 is a screen display illustrating the "split-screen" approach to editing assignments.

Typically, users of project management software need to be able to edit the assignments for a task, such as by adding and removing assignments or editing the amount of total work for an assignment. There are several existing solutions in project management software that allow the user to edit the assignments for a task. One of these solutions is the "split-screen" approach, such as shown in FIG. 1. For the "split-screen" approach, the screen 100 is split into a top half 105 of the screen and a bottom half 110 of the screen.

The top half 105 of the screen shows a particular task 115 that has been selected for editing. The bottom half 110 of the screen shows an editable list 120 of the assignments for the selected task. Each assignment in the editable list 120 of assignments includes a resource name 122 and a work value 124. A user can edit the assignments for the selected task 115 by making changes to the editable list 120 of assignments in the bottom half 110 of the screen.

The "split-screen" approach, shown in FIG. 1, suffers from several drawbacks. One of the drawbacks of the "split-screen" approach is that it is not easily discovered by the user. In other words, many users do not know that the option of splitting a screen is available. Moreover, some users realize that the option of splitting the screen is available, but cannot remember the steps involved in splitting the screen. Splitting the screen typically requires choosing a "split" command from a menu window or by grabbing and dragging a divider in the bottom right corner of the screen.

A second drawback of the "split-screen" approach is that it is awkward to use because the user must switch back and forth between two different screen regions, the top half 105 and the bottom half 110. For instance, to edit assignments for a task, the user selects the particular task 115 that is to be edited in the top half 105 of the screen and then must switch to the bottom half 110 of the screen to make changes to the editable list 120 of assignments.

A third drawback of the "split-screen" approach is the master-slave relationship between the two screen regions 105 and 110. In other words, selecting an item in one screen region controls the contents of the other screen region. For example, editing the editable list 120 of assignments makes changes to the selected task 115 in the top half 105 of the screen. This master-slave relationship can be difficult for users to understand.

Still another drawback of the "split-screen" approach is the problem of focus. The region of the screen with focus is the region of the screen in which keystrokes will be entered. Sometimes, users will type in information that they wish to enter into a first screen region; however, the information is entered into a second screen region because the second screen region has focus. For instance, the user may wish to enter information into the top half 105 of the screen, but it will be entered into the bottom half 110 if the bottom half has focus, or vice versa. It can be difficult for a user to remember which screen region has focus and frustrating when they realize that their keystrokes have been entered into the wrong screen region.

Figure 2:
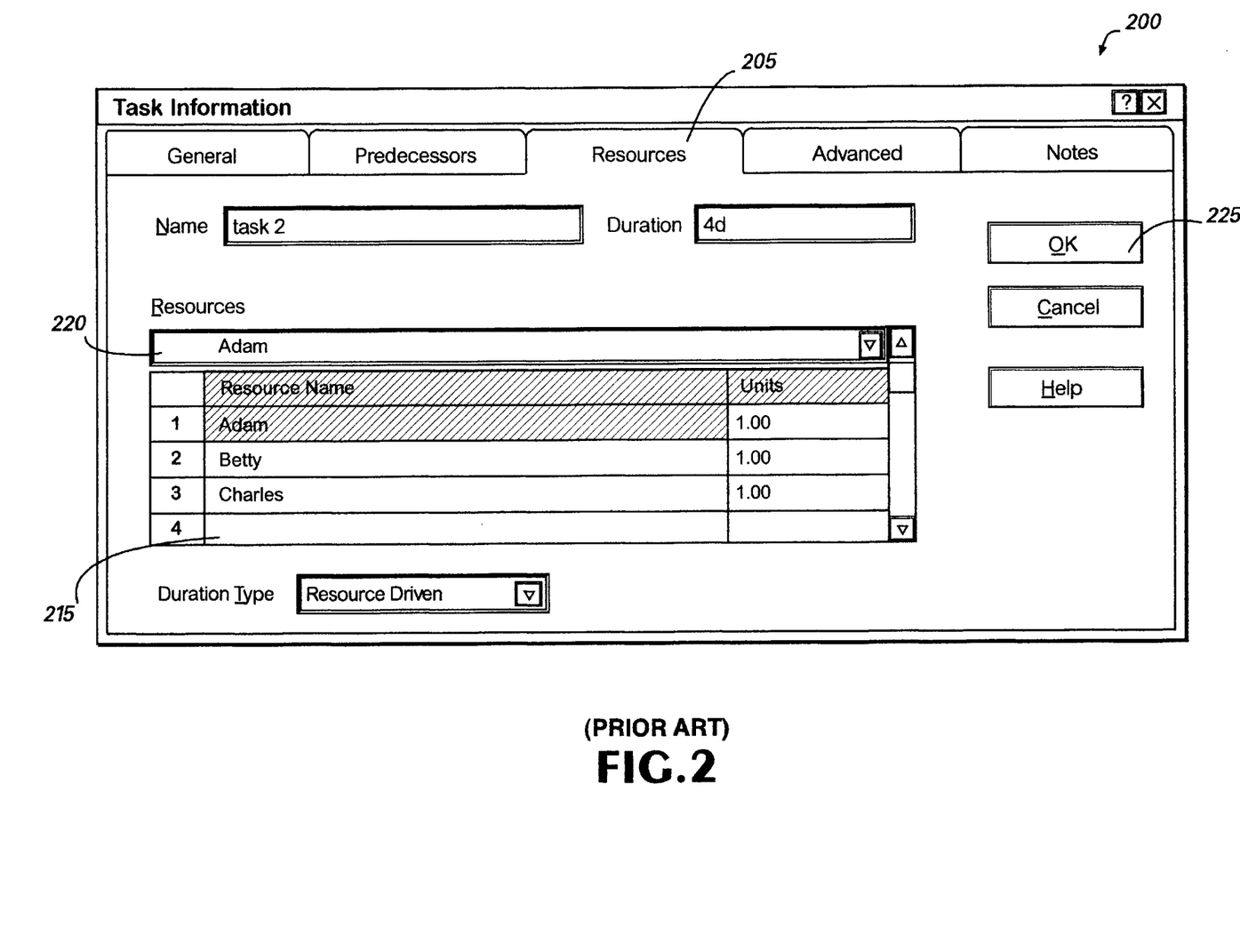
FIG. 2 is a screen display illustrating a details dialog for editing assignments.

In addition to the "split-screen" approach, project management software provides other solutions that allow a user to edit the assignments for a task. Another solution is a details dialog 200, such as shown in FIG. 2, that lists all of the assignments for a task.

The details dialog 200 suffers from some of the same drawbacks as the "split-screen" approach. First, the details dialog suffers from a lack of discoverability. Typically, the details dialog 200 is entered by either double-clicking a mouse button on a task row, such as task row 115 (FIG. 1), or by choosing a menu item from a menu bar, such as menu bar 125 (FIG. 1). Most users do not discover that a task has a details dialog and, therefore, most users never find the details dialog to make edits. Second, even if users do discover the details dialog, it can be awkward to use because many steps are involved in making simple edits. For example, to add an assignment, the user double-clicks on the task row 115 (FIG. 1), clicks on the "resources" tab 205, scrolls to an empty row 215, clicks in the empty row 215, selects a name from the dropdown in the edit bar 220, and presses the OK button 225. Thus, using the details dialog to make edits is awkward because multiple steps must be performed, even for simple edits.

Figure 3:
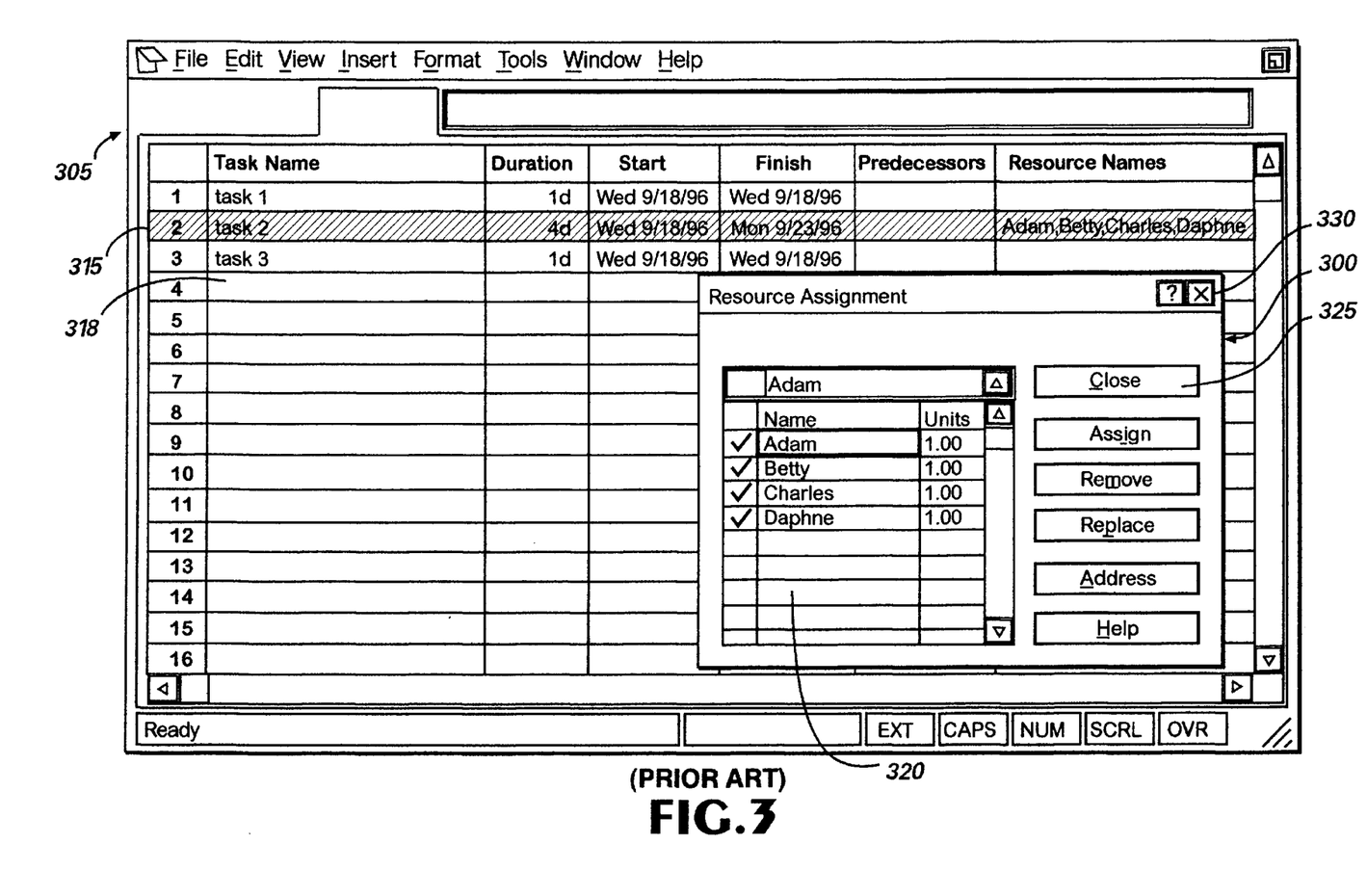
FIG. 3 is a screen display illustrating a floating palette for editing assignments.

Still another solution that allows the user to edit assignments is a floating palette, such as floating palette 300 shown in FIG. 3. The floating palette 300 is displayed to the user over the task screen 305 of the project management software. The floating palette 300 lists all the individuals available for assignment in an editable list 320, along with controls for editing the assignments. Similar to the "split-screen" approach, the contents of the floating palette 300 are driven by the selected task 315 in a task list 318 of the task screen 305.

The floating palette 300 suffers from all of the drawbacks of the "split-screen" approach shown in FIG. 1. The floating palette 300 suffers from the problem of discoverability, i.e., the floating palette is not easily discovered by the user. The floating palette 300 is awkward to use because the user must switch back and forth between two different screen regions, the task screen 305 and the floating palette. For instance, to make changes to assignments, the user selects the particular task 315 that is to be edited in the task screen 305 and then switches to the floating palette 300 to make edits to the assignments for the selected task 315.

Another drawback of the floating palette 300 is the master-slave relationship between the floating palette 300 and the task screen 305. Editing the editable list 320 of assignments makes changes to the selected task 315 in the task screen 305. As described above, this master-slave relationship can be difficult for users to understand and can be distracting to the user.

Another drawback of the floating palette 300 is the problem of focus. For instance, the user may wish to enter information in the task screen 305, but it will be entered into the floating palette 300 if the floating palette has focus, or vice versa. It can be difficult for a user to remember which screen region has focus and frustrating when they realize that the keystrokes they have entered have been entered into the wrong screen region.

Therefore, there is a need in the art for a project management program module that simplifies the process of editing assignments. There is a further need for a project management program module that provides a solution for editing assignments that is easily discoverable. There is still a further need for a project management program module that provides a solution for editing assignments that does not cause confusion over which screen region has focus. There is a further need for a project management program module that provides a solution for editing assignments that does not involve a master-slave relationship.

SUMMARY OF THE INVENTION

The present invention satisfies the above described needs by providing a system for editing assignments for a task. An indication is received from a user that the assignments are to be edited. In response to receiving the indication that the assignments are to be edited, a grid comprising a name column and a total work column is displayed on a display device. The grid can be implemented as a dropdown grid.

Typically, the user selects a navigation aid to open the dropdown grid. The dropdown grid can include an equal number of name cells and total work cells. Each of the name cells corresponds to an assignment and includes an individual's name and a checkbox next to the individual's name. Each of the total work cells includes an amount of total work for one of the assignments.

When an indication is received that an assignment has been added, then a checkmark is displayed in the checkbox corresponding to the assignment that was added. When an indication is received that an assignment has been deleted, then the checkmark is removed from the checkbox corresponding to the assignment that was deleted. The method further comprises the steps of receiving an indication that the amount of total work for one of the assignments was edited and displaying a new amount of total work for the assignment.

The dropdown grid can include resource identifiers and total work amounts displayed in a grid having a number of rows. Each of the rows can include a resource identifier column and a total work column. Each row can correspond to one of the assignments. The resource identifiers are displayed in the resource identifier column and the total work amounts are displayed in the total work column. The resource identifier column can further include a number of checkboxes, which each checkbox is associated with one of the resource identifiers. When an indication is received that one of the checkboxes has been selected, a checkmark can be displayed in the selected checkbox. The checkmark indicates that the assignment in the row of the selected checkbox has been activated, or assigned. When an indication is received that one of the checkboxes has been de-selected, then a checkmark can be removed from the de-selected checkbox and removing the assignment in the row of the de-selected checkbox.

The total work column can include a number of cells, each of the cells corresponding to a total work amount. An indication can be received that one of the cells has been selected and a new total work amount for the selected cell can be received. In response to receiving the new total work amount, the new total work amount can be displayed in the selected cell.

In order to display the grid to edit assignments, a number of steps can be performed. A list of tasks can be displayed on a display device, each task including a cell corresponding to the people assigned to the task, also known as a people assigned cell. When an indication is received that one of the people assigned cells has been selected, a dropdown arrow, or other navigation aid, can be displayed in the selected people assigned cell. When an indication that the dropdown arrow has been selected, then a set of assignments can be retrieved and displayed on the display device in the grid. When an indication is received that an edit has been made to one of the assignments, then the grid can be re-displayed on the display device with the edit incorporated into the assignments.

In another aspect, the present invention can be implemented in a computer system for editing a number of assignments for a task. The computer system includes a processor, a memory storage device for storing a program module, a display device coupled to the processor for displaying information and an input device coupled to the processor for manipulating a selection indicator displayed on the display device. The processor, responsive to instructions from the program module, can display on the display device a grid with resource identifier cells and total work cells. Each of the resource identifier cells can include a checkbox and a resource identifier. Each of the total work cells can include an amount of total work. If the selection indicator is positioned over one of the resource identifier cells and selected, then a determination is made whether the checkbox for the selected resource identifier cell includes a checkmark. If so, then the checkmark can be removed. If the checkbox for the selected resource identifier cell does not include a checkmark, then a new checkmark can be added to the checkbox. If the selection indicator is positioned over one of the total work cells and selected, then a new amount of total work can be entered through the input device.

These and other features, advantages, and aspects of the present invention may be more clearly understood and appreciated from a review of the following detailed description of the disclosed embodiments and by reference to the appended drawings and claims.

DETAILED DESCRIPTION

The present invention is directed toward a system for editing multi-valued properties of an object. More particularly, this invention relates to editing the assignments for a task in a project management software environment. In one embodiment, the invention is incorporated into a project management application program entitled "TEAM MANAGER", marketed by Microsoft Corporation of Redmond, Wash. Briefly described, the program allows a user to consolidate, coordinate and track information concerning a project team, such as the total amount of work required to complete an assignment.

Referring now to the drawings, in which like numerals represent like elements throughout the several figures, aspects of the present invention and the exemplary operating environment will be described.

EXEMPLARY OPERATING ENVIRONMENT

Figure 4:
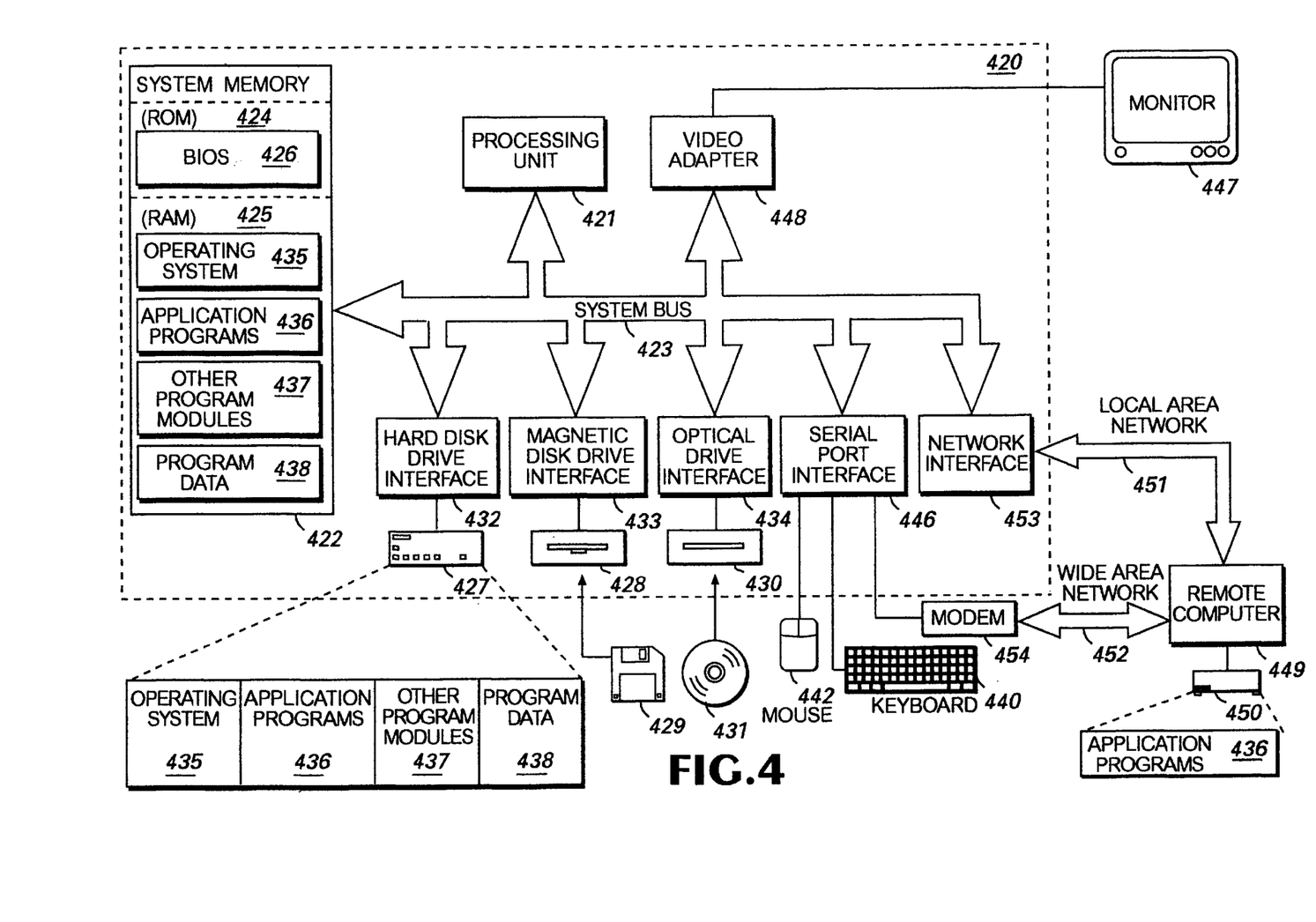
FIG. 4 is a block diagram of the exemplary operating environment for the preferred embodiment of the present invention.

FIG. 4 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 4, an exemplary system for implementing the invention includes a conventional personal computer 420, including a processing unit 421, a system memory 422, and a system bus 423 that couples the system memory to the processing unit 421. The system memory 422 includes read only memory (ROM) 424 and random access memory (RAM) 425. A basic input/output system 426 (BIOS), containing the basic routines that help to transfer information between elements within the personal computer 420, such as during start-up, is stored in ROM 424. The personal computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage for the personal computer 420. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 425, including an operating system 435, one or more application programs 436, other program modules 437, and program data 438. A user may enter commands and information into the personal computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a game port or a universal serial bus (USB). A monitor 447 or other type of display device is also connected to the system bus 423 via an interface, such as a video adapter 448. In addition to the monitor, personal computers typically include other peripheral output devices (not shown), such as speakers or printers.

In the exemplary operating environment, when the user moves the mouse 442, a small, bit-mapped icon called the mouse cursor, or pointer, is moved on the monitor 447. The mouse cursor may be displayed as any of a variety of icons, which are selected according to the operation being conducted. The mouse cursor has a single-pixel hot spot that corresponds to a precise location on the monitor 447. The standard mouse operations include the following:

Clicking—pressing and releasing a mouse button.

Double-clicking—pressing and releasing a mouse button twice in quick succession.

The personal computer 420 may operate in a networked environment using logical connections to one or more remote computers, such as a remote computer 449. The remote computer 449 may be a server, a router, a peer device or other common network node, and typically includes many or all of the elements described relative to the personal computer 420, although only a memory storage device 450 has been illustrated in FIG. 4. The logical connections depicted in FIG. 4 include a local area network (LAN) 451 and a wide area network (WAN) 452. Such networking environments are commonplace in offices, enterprise-wide computer networks, intranets and the Internet.

When used in a LAN networking environment, the personal computer 420 is connected to the LAN 451 through a network interface 453. When used in a WAN networking environment, the personal computer 420 typically includes a modem 454 or other means for establishing communications over the WAN 452, such as the Internet. The modem 454, which may be internal or external, is connected to the system bus 423 via the serial port interface 446. In a networked environment, program modules depicted relative to the personal computer 420, or portions thereof, may be stored in the remote memory storage device. It will be appreciated that the network connections shown are exemplary and other means of establishing a communications link between the computers may be used.

EDITING MULTI-VALUED PROPERTIES OF AN OBJECT

Briefly described, the present invention provides a system for editing multi-valued properties of an object. In an exemplary embodiment, the multi-valued property is an assignment and the object is a task. Editing is preferably performed in a dropdown grid. The dropdown grid typically includes a plurality of cells in a name column and a total work column. Preferably, the user may assign an individual to a task or remove an individual from a task by checking or unchecking a checkbox in a name column cell. In addition, the user may edit the amount of total work for an assignment by selecting the total work cell corresponding to the assignment and entering a total work value. In one embodiment, the present invention is incorporated into the application program, the "TEAM MANAGER" program, which will be described briefly below.

Generally, the "TEAM MANAGER" program allows a user to enter and manipulate tasks, resources, and assignments. A task is a project that needs to be completed. Resources are typically the individuals who complete the tasks. Assignments are the links between tasks and resources. In other words, an assignment is the allocation of a particular resource, or individual, to a particular task. Several resources, or individuals, may be assigned to complete a task. Thus, there may be several assignments needed to complete one task. Those skilled in the art will appreciate that the present invention is a computer-implemented process that is carried out by the computer in response to input from the user and instructions provided by the application program module.

Briefly described, in an exemplary embodiment, the method begins when a user selects a "People Assigned" cell from a task sheet. The application program module can display a dropdown arrow in the people assigned cell when the user selects the people assigned cell. The user can then select the dropdown arrow to open a dropdown grid. The dropdown grid is a grid that includes a name column, including a checkbox, and a total hours column. The user can select a cell in the dropdown by using the arrow keys on the keyboard or by clicking the mouse button. For cells under the total work column, the user can edit the total hours for each assignment. For cells under the name column, the user can assign an individual to a task and remove an individual from a task by checking and unchecking the checkbox in the name column cell corresponding to the individual that the user wishes to assign or remove.

Figure 7:
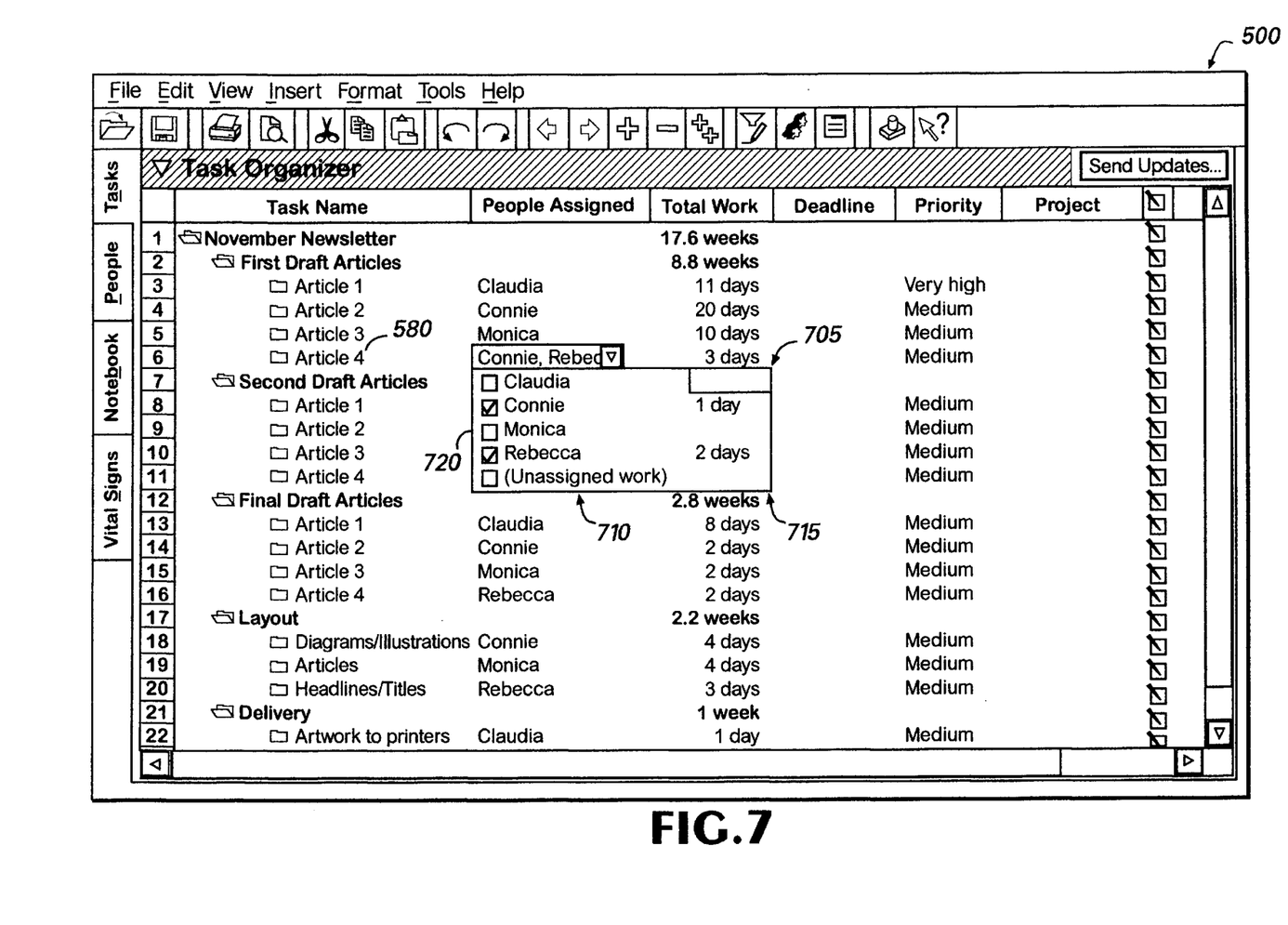
FIGS. 7–8 are screen displays of the task sheet with the people dropdown grid.
Figure 8:
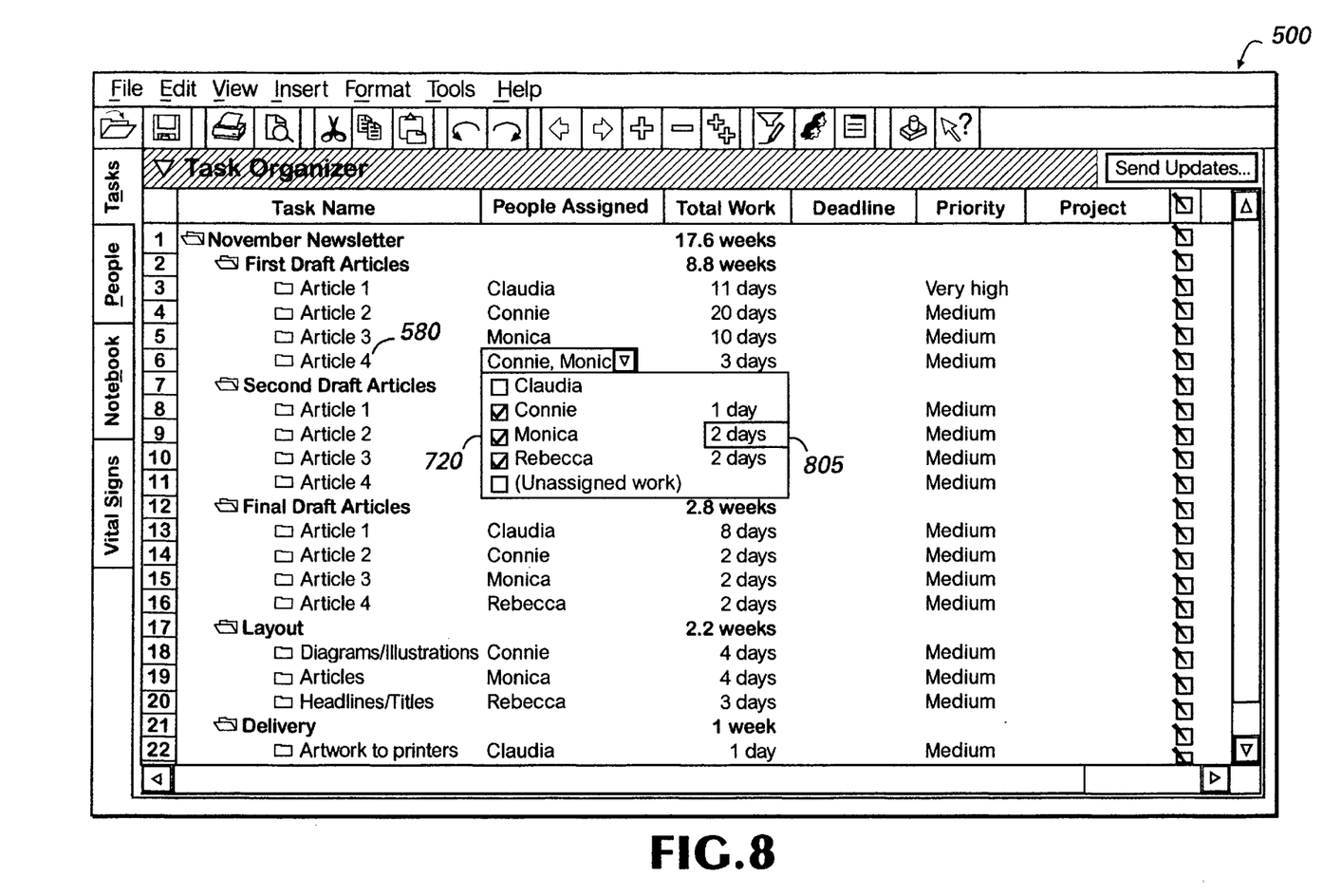
Figure 9:
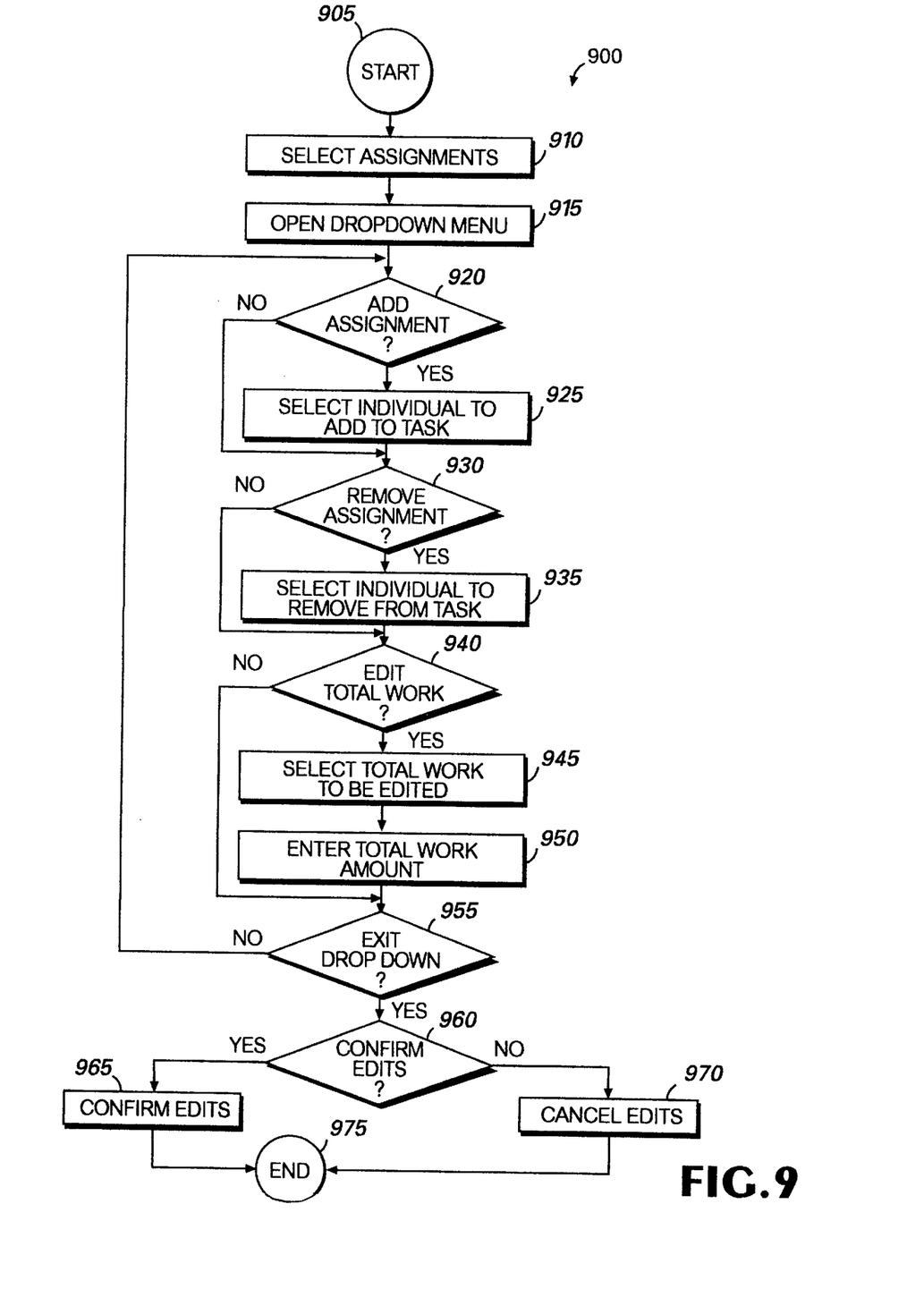
FIG. 9 is a flow diagram illustrating the steps of an exemplary embodiment of the present invention as perceived by a user.
Figure 10:
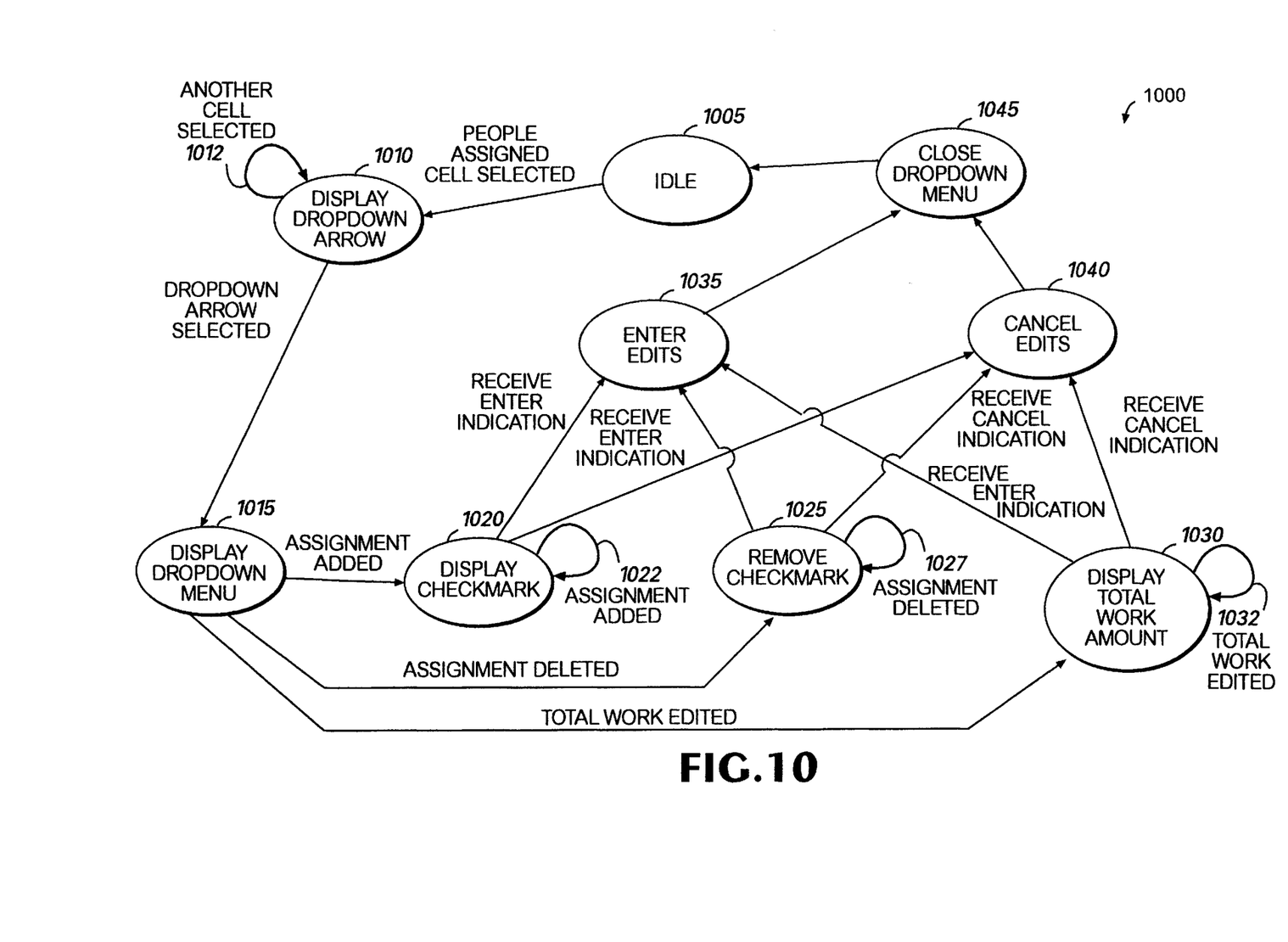
FIG. 10 is a state diagram illustrating the states of an exemplary embodiment of the present invention as implemented by an application program running on a personal computer.

Turning now to FIGS. 5–10, a method for editing assignments for a task will be described. FIGS. 5–8 are illustrations of screen displays illustrating the preferred method for editing assignments for a task. FIG. 9 is a flow diagram illustrating the steps taken by a user in order to edit assignments using an exemplary embodiment of the present invention. FIG. 10 is a state diagram illustrating steps completed by the present invention as implemented by an application program running on a personal computer.

Figure 5:
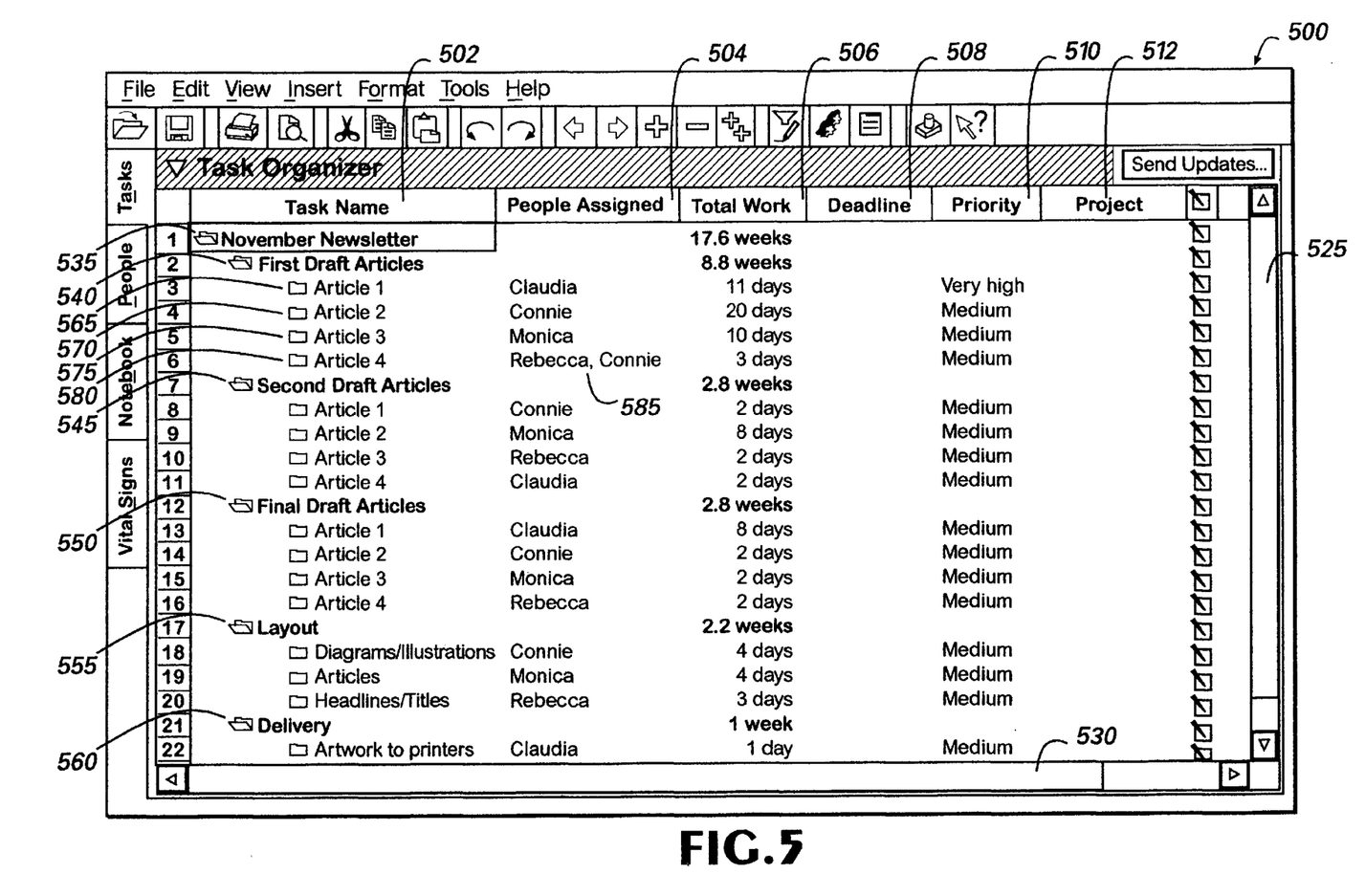
FIG. 5 is a screen display of a task sheet.

Referring now to FIG. 5, a screen display of a task sheet window 500 is shown. The task sheet window 500 includes a task name column 502, a people assigned column 504, a total work column 506, a deadline column 508, a priority column 510 and a project column 512. A menu bar 520 is displayed along the top edge of the task sheet window 500. A vertical scroll bar 525 and horizontal scroll bar 530 are positioned along the right and bottom edges, respectively, of the task sheet window 500.

The task name column 502 includes tasks represented as leaf tasks. The leaf tasks can be stored in summary tasks. Summary tasks can also be stored in other summary tasks. For example, referring to FIG. 5, summary task 535 entitled November Newsletter includes a summary task 540 entitled First Draft Articles, a summary task 545 entitled Second Draft Articles, a summary task 550 entitled Final Draft Articles, a summary task 555 entitled Layout and a summary task 560 entitled Delivery.

Within the First Draft Articles summary task 540 are a number of leaf tasks associated with various tasks. For example, within the First Draft Articles summary task 540 is a leaf task 565 entitled Article 1, a leaf task 570 entitled Article 2, a leaf task 575 entitled Article 3, and a leaf task 580 entitled Article 4. Each leaf task, such as leaf tasks 565, 570, 575 and 580 represents a task that needs to be completed. For instance, the Article 4 leaf task 580 within the First Draft Articles folder 540 may represent the task of completing the first draft of Article 4. The summary tasks are useful for grouping together tasks that are somehow related. It should be understood that the summary tasks and leaf tasks in FIGS. 5–8 are representative examples only and that a user of the preferred application program module can enter leaf tasks and summary tasks representing tasks that the user wishes to track.

Still referring to FIG. 5, the task sheet window 500 also includes the people assigned column 504. The people assigned column 504 includes cells that list the individuals, or people, who have been assigned to complete a specific task. For example, the people assigned cell 585 includes individuals named Rebecca and Connie who have been assigned to the task 580 of completing the first draft of Article 4.

The task sheet window 500 further includes a total work column 506. The total work column 506 is a running total of the amount of actual work and remaining work for a particular task. The actual work is the amount of work that has been completed on a task. The remaining work is the amount of work that remains to be completed for a task. Thus, each leaf task has an amount of total work. Moreover, each summary task containing multiple leaf tasks has an amount of total work that is equal to the sum of the total work for each of the leaf tasks in that folder. For instance, referring to FIG. 5, the Article 1 leaf task 565 has a total work of 11 days, the Article 2 leaf task 570 has a total work of 20 days, the Article 3 leaf task 575 has a total work of 10 days and the Article 4 leaf task 580 has a total work of 3 days. Still referring to FIG. 5, the First Draft Articles summary task 540 has a total work equal to the sum of the total work for all of the tasks in the folder, i.e., a total work equal to 44 days, or 8.8 weeks (based on a 5 day work week).

The task sheet window 500 also includes a deadline column 508 which can be used to display the date of a deadline for a particular task. The task sheet window 500 further includes a priority column 510 that can be used to assign a priority, such as low, medium, high, or very high, to a particular task. The task sheet 500 also includes a project column 512 which is used for organizing tasks under high-level projects.

Having described the basic elements of the task sheet window 500 in reference to FIG. 5, an exemplary embodiment of the present invention for editing assignments will be described. Referring now to FIG. 5, none of the people assigned cells under the people assigned column 504 have been selected at this point. The editing process begins when the user selects the people assigned cell that corresponds to the particular task for which the user wants to make edits. For example, referring to FIG. 6, suppose the user wants to edit the assignments for the First Draft Article 4 task 580. In order to select a people assigned cell, the user moves the mouse cursor over the people assigned cell to be selected and clicks the mouse button. Alternatively, the user presses the arrow keys on the keyboard until the proper cell is located.

Figure 6:
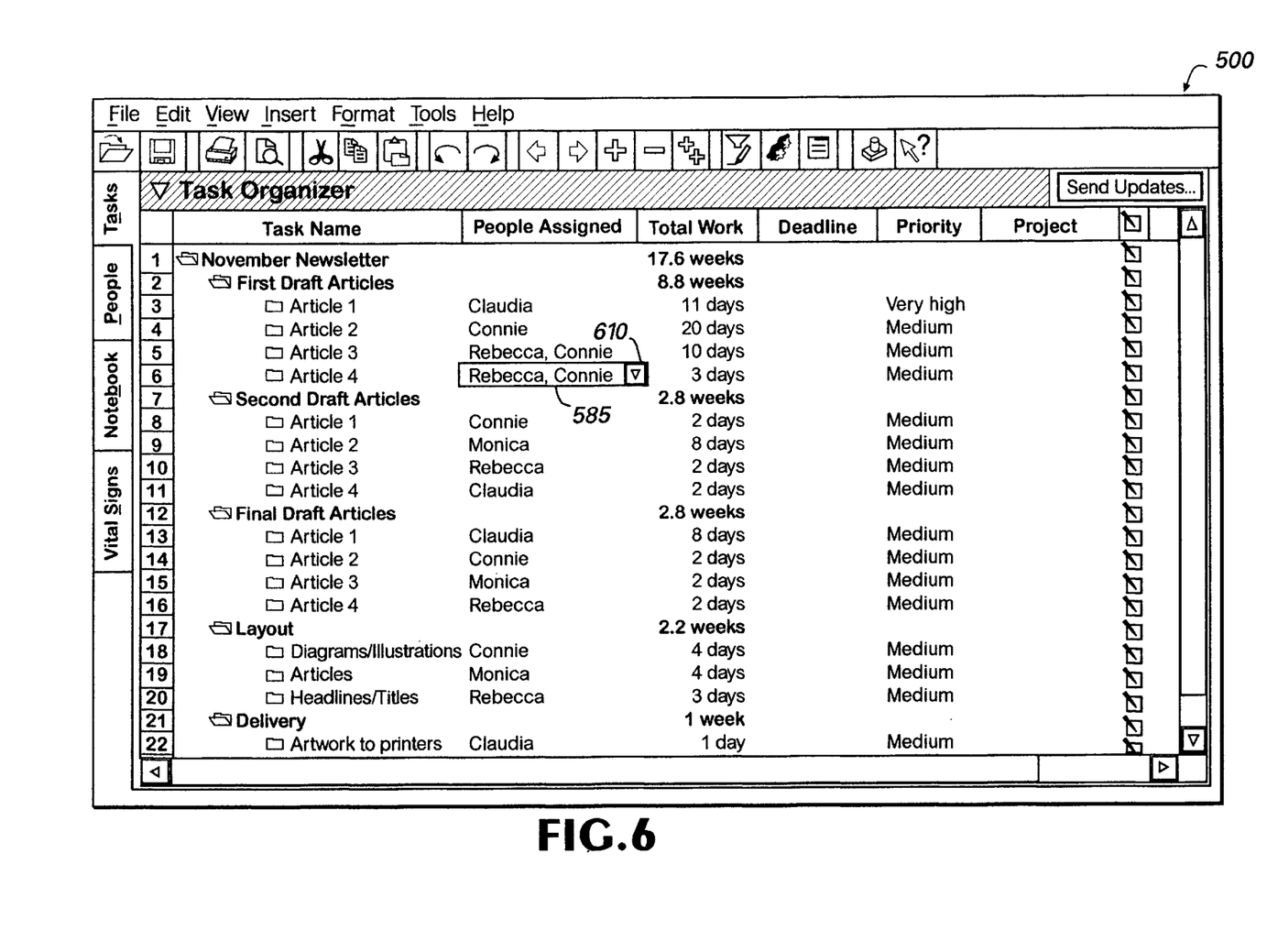
FIG. 6 is a screen display of the task sheet with a people assigned cell selected.

FIG. 6 is a screen display of the task sheet window 500 after the people assigned cell 585 has been selected. Once the user selects a people assigned cell, such as cell 585 in FIG. 6, the application program displays a dropdown arrow 610 in the selected people assigned cell.

The next step in the editing process is for the user to open a dropdown grid by selecting the dropdown arrow 610. In order to select the dropdown arrow 610, the user moves the mouse cursor over the dropdown arrow and clicks the mouse button. Alternatively, the user can open the dropdown grid by pressing the "alt" key and the down arrow key on the keyboard or by selecting the "F4" key.

FIG. 7 is a screen display of the task sheet window 500 after the user has opened dropdown grid 705, such as by clicking the mouse button over the dropdown arrow. The dropdown grid 705 preferably includes a name column 710 and a total work column 715. The name column includes an alphabetical listing of all the individuals available to work on a task, even if the individual is not assigned to the selected task. The name column also preferably includes a plurality of checkboxes, such as checkbox 720. Each individual's name and its corresponding checkbox constitute a cell in the name column 710. The checkbox indicates whether or not the individual in that row is assigned to the selected task 580. A checkmark in a checkbox indicates that the individual is assigned to the selected task whereas the absence of a checkmark in a checkbox indicates that the individual is not assigned to the selected task. When a checkbox is selected, the application program shifts the state of the assignment corresponding to the checkbox. The assignment can be in one of two states, active or inactive. Thus, if an assignment is inactive, then selecting the checkbox column causes the application program to activate, or add the assignment. Conversely, if an assignment is active, then selecting the checkbox column causes the application program to delete, or remove, the assignment. Those skilled in the art will recognize that embodiments of the present invention are possible using, instead of checkboxes, alternative binary state controls. For instance, binary state controls such as a button that toggles up and down, or two radio buttons, one for yes and one for no, could be used instead of the checkboxes.

The total work column 715 includes a plurality of cells corresponding to the total work for each assignment. For example, referring to FIG. 7, Connie is the name of an individual who has been assigned to task 580 since the checkbox next to Connie's name in the name column 710 includes a checkmark. In addition, the total work for Connie's assignment is 1 day since this is the amount of total work listed in the total work cell under total work column 715 that is in the same row as Connie's name.

Thus, it should be noted that each row in the dropdown grid 705 corresponds to an assignment, i.e., an individual assigned to complete a total amount of work on a task. Preferably, the dropdown grid 705 also includes an assignment of work to a resource known as "Unassigned Work". The "Unassigned Work" assignment is used to indicate work that needs to be accomplished for the selected task 580, but which has not yet been assigned to a particular individual.

As mentioned above, it should be noted that the dropdown grid 705 is a grid. By using the up and down arrow keys on the keyboard, the user can move vertically up and down the name column 710 and the total work column 715. In addition, by using the left and right arrow keys, the user can move horizontally from the total work column 715 to the name column 710 and from the name column to the total work column. The user can also select different cells in the dropdown grid by clicking the mouse button over the cell which the user desires to select. Having briefly described the dropdown grid 705, the final steps of the editing process will be described.

The final steps for the editing process are for the user to assign individuals to a task or remove individuals from a task, i.e., add or remove assignments, by selecting the cell in the name column corresponding to the individual that the user wishes to assign or remove and to edit the total work for an assignment by selecting a cell in the total work column and using the keyboard to enter a total work value.

FIG. 8 is a screen display of the task sheet window 500 after the user has added an assignment and edited the total work for the new assignment. As shown in FIG. 8, Monica has been added to task 580 as indicated by the checkmark in checkbox 720 next to Monica's name. Preferably, a checkmark can be activated/deactivated by either clicking on the cell under the name column corresponding to the individual that is to be added or removed. Alternatively, a checkmark can be activated/deactivated by using the arrow keys to select the cell and then pressing the space bar.

As shown in FIG. 7, Monica does not have a checkmark in the checkbox 720 by her name. Thus, in FIG. 7, Monica has not been assigned to the selected task 580. However, as shown in FIG. 8, after the user activates the checkmark next to Monica's name, Monica is added to the selected task 580. Preferably, after Monica is added to the selected task 580, the application program module selects the total work cell 805 corresponding to the total work for the assignment that was added. The user can then enter the amount of total work for the assignment that was added by typing in the total work amount using the keyboard. For example, referring to FIG. 8, the user has entered a total work amount of 2 days for the assignment of Monica to the selected task 580.

FIG. 9 is a flow diagram illustrating the steps of an exemplary embodiment of the present invention in terms of the actions completed by a user. The flow diagram in FIG. 9 summarizes the steps that are described above in conjunction with FIGS. 5–8.

At step 905, the assignment editing method 900 begins and proceeds to step 910 when the user selects the people assigned cell corresponding to the selected task 580. In other words, method 900 proceeds to step 910 when the user selects the assignments that are to be edited. When the user selects the people assigned cell, a dropdown arrow is preferably displayed to the user. At step 915, the user opens the dropdown grid, preferably by selecting the dropdown arrow.

At decision step 920, the user decides whether to add an assignment. If the user decides to add an assignment, then the method proceeds to step 925. The user selects the checkbox in the name column 710 (FIG. 7) corresponding to the individual that the user wants to assign to the task 580 at step 925 and the method proceeds to decision step 930.

If, at decision step 920, the user does not want to add an assignment, then the method also proceeds to decision step 930. At decision step 930, the user decides whether to remove any assignments. If the user decides to remove assignments, then the method proceeds to step 935. The user selects the checkbox in the name column 710 (FIG. 7) corresponding to the individual that the user wants to remove from the task 580 at step 935 and the method proceeds to decision step 940.

If, at decision step 930, the user does not want to remove an assignment, then the method also proceeds to decision step 940. The user decides whether to edit the total work amounts for an assignment at decision step 940. If the user decides to edit the total work amount for an assignment, then the method proceeds to step 945 where the user selects the total work for the assignment which is to be edited, preferably by selecting a cell in the total work column. At step 950 the user enters an amount of total work for the assignment and the method proceeds to decision step 955.

If, at decision step 940, the user decides not to edit the total work for an assignment, then the method also proceeds to decision step 955. The user decides whether to exit the dropdown at decision step 955. If the user decides not to exit the dropdown, then the method returns to decision step 920. However, if the user decides to exit the dropdown, then the method proceeds to decision step 960.

The user decides whether to confirm the edits at decision step 960. If the user decides to confirm the edits, then the method proceeds to step 965 where the edits are confirmed, preferably by pressing the "ENTER" key on the keyboard or by clicking the mouse outside of the dropdown grid 705. However, if at decision step 960, the user decides not to confirm the edits, then the method proceeds to step 970 where the edits are canceled, preferably by pressing the "ESC" key on the keyboard. The method ends at step 975.

FIG. 10 is a state diagram illustrating the method 1000 of the present invention as implemented by an application program running on a personal computer. The method 1000 begins at idle state 1005. At this point, the application program is running and the people assigned cell corresponding to the assignments that are to be edited has not been selected by the user. Those skilled in the art will understand that the method 1000 is associated with assignment editing only and that the application program may perform any of a variety of functions while the method 1000 is in its idle state. FIG. 5 is an example of the display when the method 1000 is in the idle state 1005.

The method 1000 leaves the idle state 1005 when the application program receives an indication that the user has selected a people assigned cell. When this occurs, the method proceeds to state 1010, and the application program displays a dropdown arrow in the people assigned cell that was selected by the user.

If another people assigned cell in the task sheet is selected, then the preferred application program module removes the dropdown arrow from the previously selected people assigned cell and displays a dropdown arrow in the people assigned cell that was selected by the user as indicated by branch 1012.

The method 1000 will exit state 1010 when an indication is received from the operating system that the user has selected the dropdown arrow, i.e., has opened the dropdown grid. When an indication is received from the operating system that the user has selected the dropdown arrow, then the method 1000 proceeds to state 1015 where the application program displays the dropdown grid 705.

The method 1000 will exit state 1015 and proceed to state 1020 when the application program receives an indication that the user has added an assignment. As mentioned above, preferably, a user adds an assignment by selecting a checkbox in the name column 710 (FIG. 7) corresponding to the individual that the user wants to assign to the task. When the application program receives an indication that an assignment has been added, then, at state 1020, a checkmark is displayed in the checkbox next to the individual who was assigned to the task while the dropdown grid continues to be displayed. As shown by branch 1022, if, at state 1020, the preferred application program module receives an indication that another assignment has been added, then the method returns to state 1020 and the preferred application program module displays a checkmark next to the name of the individual who was assigned to the task.

The method 1000 will also exit state 1015 and proceed to state 1025 when the application program receives an indication that an assignment has been deleted. As mentioned above, preferably, a user deletes an assignment by selecting the checkbox in the name column 710 (FIG. 7) corresponding to the individual that the user wants to remove from the task. When the preferred application program module receives an indication that an assignment has been deleted, then, at step 1020, a checkmark is removed from the checkbox next to the individual who was removed from the task while the dropdown grid continues to be displayed. As shown by branch 1027, if, at state 1025, the preferred application program module receives an indication that another assignment has been deleted, then the method returns to state 1025 and the preferred application program module removes the checkmark next to the name of the individual who was removed from the task.

The method 1000 will also exit state 1015 and proceed to state 1030 when the preferred application program module receives an indication that the total work for an assignment has been edited. As mentioned above, preferably, a user edits the total work for an assignment by selecting a total work cell and entering an amount of total work. When the preferred application program module receives an indication that the total work for an assignment has been edited, then, at step 1030, the total work amount that was entered is displayed in the dropdown grid. As shown by branch 1032, if, at state 1030, the preferred application program module receives an indication that the total work for another assignment has been edited, then the method returns to state 1030 and the preferred application program module displays the total work amount in the dropdown grid.

If, at state 1020, 1025, or 1030, the application program module receives an indication that the user wishes to enter the edits that have been made, then the method proceeds to state 1035. At state 1035, the edits, such as assignments that were added and removed and total work that was edited, are saved by the preferred application program module and the method proceeds to state 1045 where the dropdown grid is closed. The method then returns to the idle state 1005.

If, at state 1020, 1025, or 1030, the application program module receives an indication that the user wishes to cancel the edits that have been made, then the method proceeds to state 1040. At state 1040, the edits, such as assignments that were added and removed and total work that was edited, are deleted by the preferred application program module. In other words, the assignments remain as they existed before method 1000 began, even if edits were made during method 1000. Then, the method 1000 proceeds to state 1045 where the dropdown grid is closed. The method then returns to the idle state 1005.

It should be understood that there are branches back and forth between states 1020, 1025, and 1030. However, these branches are not shown in FIG. 10 for the sake of clarity. For example, at state 1020, the method 1000 can proceed to state 1025 if an indication that an assignment has been deleted is received or can proceed to state 1030 if an indication that the total work for an assignment has been edited is received.

Those skilled in the art will appreciate that the present invention provides a method for adding and deleting assignments and editing the total work for assignments. Those skilled in the art will appreciate that the present invention is not limited to editing assignments. The present invention can be used to edit any multi-valued property of an object. In the preferred embodiment, the object is the task, the multi-valued property is an assignment and the multiple values of each property are the name and the total work value.

It should be further understood that the present invention provides a method for setting a multi-valued property from a pre-defined list of possible values. For example, the present invention may be used to assign categories to an e-mail message or other document. There may be a pre-defined list of possible values for the categories, e.g., Business, Holidays, Personal, Status, Ideas, etc. A dropdown may be displayed in the "categories" cell. The user may then select the "categories" cell which will cause a "categories" dropdown to appear with the pre-defined list of possible values. The user, by selecting the mouse button, may then "click" on and off the categories.

It should be further understood that the present invention provides a method for setting a multi-valued property from a pre-defined list of possible values and then further setting a single property on each of these component values. For example, the pre-defined list of possible values may be all of the people who can be assigned to a task. The single property that can be set on each of these component values may be their work amount.

It should be still further understood that the present invention provides a method for setting a multi-valued property from a pre-defined list of possible values and then setting multiple properties on each of those component values. For example, the pre-defined list of possible values may be all of the people who can be assigned to a task. The multiple properties that can be set on each of those component values may be work amount and the maximum amount of work that can be assigned to a person.

Although the present invention has been described above as implemented in the preferred project management program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method for editing a property of an object comprising the steps of:
   displaying a plurality of objects and a plurality of properties in a list, each property comprising a first value and a second value;
   displaying a grid for a respective property within said list and corresponding to a respective object, the grid comprising a first value display and a second value display;
   determining when the second value display has been selected; and
   receiving second value data corresponding to the second value associated with the property.

2. The method recited in claim 1, further comprising the steps of:
   receiving an indication confirming the second value; and
   saving the second value data.

3. The method recited in claim 2, wherein each property is an assignment and each object is a task, and wherein the first value is a name and the second value is an amount of total work.

4. The method recited in claim 3, wherein the grid is a dropdown grid wherein the first value display is a name display and the second value display is a total work display, and wherein the name display includes a checkbox and the name and the total work display includes the amount of total work.

5. The method recited in claim 4, wherein the name display is a first cell and the total work display is a second cell, and wherein the checkbox in the name display can be checked to indicate that the assignment is active.

6. A method in a computer system for displaying on a display device a dropdown grid for a plurality of assignments of a task, the dropdown grid including resource identifiers and total work amounts, the method comprising the steps of:
   receiving an indication that the dropdown grid is to be displayed using a grid having a plurality of rows, wherein each of the rows includes a resource identifier column and a total work column; and
   displaying the dropdown grid on the display device, wherein the resource identifiers are displayed in the resource identifier column and the total work amounts are displayed in the total work column.

7. The method recited in claim 6, wherein each of the plurality of rows corresponds to one of the plurality of assignments.

8. The method recited in claim 7, wherein the resource identifier column further comprises a plurality of checkboxes wherein each checkbox is associated with one of the resource identifiers.

9. The method as recited in claim 8, further comprising the steps of:
   receiving an indication that one of the checkboxes has been selected; and
   in response to receiving the indication that one of the checkboxes has been selected, displaying a checkmark in the selected checkbox and activating the assignment in the row of the selected checkbox.

10. The method as recited in claim 8, further comprising the steps of:
    receiving an indication that one of the checkboxes has been de-selected; and
    in response to receiving the indication that one of the checkboxes has been de-selected, removing a checkmark from the de-selected checkbox and removing the assignment in the row of the de-selected checkbox.

11. The method as recited in claim 8, wherein the total work column includes a plurality of cells, each of the cells corresponding to a total work amount, and further comprising the steps of:
    receiving an indication that one of the cells has been selected;
    receiving a new total work amount for the selected cell; and
    in response to receiving the new total work amount, displaying the new total work amount in the selected cell.

12. In a computer system having a display device, a method of editing assignments in a grid on the display device, comprising the steps of:
    (a) displaying on the display device a list of tasks, each task including a cell corresponding to the people assigned to the task;
    (b) receiving an indication that one of the cells corresponding to the people assigned to one of the tasks has been selected;

(c) displaying on the display device a dropdown arrow in the selected cell;

(d) receiving an indication that the dropdown arrow has been selected;

(e) in response to receiving the indication that the dropdown arrow has been selected, retrieving a set of assignments; and (f) displaying on the display device the set of assignments in the grid on the display device.

13. The method recited in claim 12, further comprising the step of receiving an indication that an edit has been made to one of the assignments and re-displaying on the display device the grid with the edit incorporated into the assignments.

14. A computer-readable medium having computer-executable instructions for performing the steps recited in claim 12.

15. A computer system for editing a plurality of assignments for a task, comprising:

a processor; and a memory storage device for storing a program module;

a display device coupled to the processor for displaying information;

an input device coupled to the processor for manipulating a selection indicator displayed on the display device;

the processor, responsive to instructions from the program module, being operative to:

display on the display device a grid comprising a plurality of resource identifier cells and a plurality of total work cells, each of the resource identifier cells including a checkbox and a resource identifier, each of the total work cells including an amount of total work;

determine if the selection indicator is positioned over one of the resource identifier cells;

if the selection indicator is positioned over one of the resource identifier cells, determine whether the selection indicator is selected;

if the selection indicator is selected, then determine whether the checkbox for the one of the resource identifier cells includes a checkmark; and if the checkbox for the one of the resource identifier cells includes a checkmark, then remove the checkmark.

16. The computer system for editing a plurality of assignments for a task as recited in claim 15, wherein the processor is further operative to:

if the checkbox for the one of the resource identifier cells does not include a checkmark, then add a new checkmark to the checkbox.

17. The computer system for editing a plurality of assignments for a task as recited in claim 16, wherein the processor is further operative to:

determine if the selection indicator is positioned over one of the total work cells;

if the selection indicator is positioned over one of the total work cells, determine whether the selection indicator is selected;

if the selection indicator is selected while the selection indicator is positioned over one of the total work cells, then receive a new amount of total work entered through the input device.

18. In a computer system, a method for displaying assignments for editing, the method comprising the steps of:

receiving an indication from a user that the assignments are to be edited;

in response to receiving the indication that the assignments are to be edited, displaying a grid comprising a name column and a total work column.

19. The method recited in claim 18 wherein the grid is a dropdown grid comprising an equal number of name cells and total work cells.

20. The method recited in claim 19 wherein the indication that the assignments are to be edited includes a user selection of a dropdown arrow in a cell corresponding to the assignments.

21. The method recited in claim 20, wherein each of the name cells correspond to an assignment and each of the name cells includes an individual's name and a checkbox.

22. The method recited in claim 21, wherein each of total work cells includes an amount of total work for one of the assignments.

23. The method recited in claim 22, further comprising the steps of:

receiving an indication that an assignment has been added; and displaying a checkmark in the checkbox corresponding to the assignment that was added.

24. The method recited in claim 23, further comprising the steps of:

receiving an indication that an assignment has been deleted; and removing a checkmark from the checkbox corresponding to the assignment that was deleted.

25. The method recited in claim 24, further comprising the steps of:

receiving an indication that the amount of total work for one of the assignments was edited; and displaying a new amount of total work for the assignment.

26. A method for setting a multi-valued property of an object comprising the steps of:

displaying a plurality of objects and a plurality of multi-valued properties in a list, each multi-valued property comprising at least one value of a plurality of values;

displaying a grid for a respective multi-valued property within said list corresponding to a respective object, said grid containing at least one value of the multi-valued property;

determining when the at least one value of the respective multi-valued property has been selected; and receiving data corresponding to a flag associated with the at least one value.

27. The method recited in claim 26, wherein each object is an electronic mail message item, each multi-valued property is a recipient list, the at least one value is a recipient name, and the flag is an indication indicating whether a reply to the electronic mail message item is necessary.

* * * * *